US012623276B2

(12) United States Patent
Oberoi et al.

(10) Patent No.: US 12,623,276 B2
(45) Date of Patent: May 12, 2026

(54) FASTENER STORAGE

(71) Applicants: The Boeing Company, Arlington, VA (US); Korean Air Lines Co., Ltd., Seoul (KR)

(72) Inventors: Harinder Singh Oberoi, Snohomish, WA (US); Kevin Marion Barrick, Kingston, WA (US); Yuanxin Charles Hu, Newcastle, WA (US); Melissa A. Johnson, Puyallup, WA (US); Laura Carolyn Foster, Brier, WA (US); Gi Jun Hong, Pusan (KR); Hwangyu Shin, Gyeongsangnam-Do (KR); Youngwoo Koh, Busan (KR)

(73) Assignee: The Boeing Company, Arlington, VA (US)

( * ) Notice: Subject to any disclaimer, the term of this patent is extended or adjusted under 35 U.S.C. 154(b) by 376 days.

(21) Appl. No.: 18/446,967

(22) Filed: Aug. 9, 2023

(65) Prior Publication Data

US 2024/0109120 A1 Apr. 4, 2024

Related U.S. Application Data

(60) Provisional application No. 63/377,543, filed on Sep. 29, 2022.

(51) Int. Cl.
B21J 15/32 (2006.01)
B23P 19/00 (2006.01)

(52) U.S. Cl.
CPC ............. B21J 15/32 (2013.01); B23P 19/001 (2013.01); B23P 19/00 (2013.01)

(58) Field of Classification Search
CPC ..... B21J 15/142; B21J 15/32; B23B 2215/04; B23B 2270/36; B23P 2700/01; B23P 19/04; B25H 3/003; B25H 3/04; B64F 5/10; B65D 73/0035; B65D 73/0007
See application file for complete search history.

(56) References Cited

U.S. PATENT DOCUMENTS

| | | | | |
|---|---|---|---|---|
| 4,007,834 | A | 2/1977 | Borgersen | |
| 4,926,719 | A | 5/1990 | Kross et al. | |
| 5,228,582 | A * | 7/1993 | Marshall | A47F 5/02 |
| | | | | 211/163 |
| 5,709,303 | A * | 1/1998 | Best | B23Q 39/028 |
| | | | | 29/33 J |
| 5,823,364 | A * | 10/1998 | Mucciacciaro | B25H 3/04 |
| | | | | 206/372 |
| 6,328,523 | B1 | 12/2001 | Watanabe et al. | |
| 7,580,773 | B2 | 8/2009 | Hariki et al. | |
| 8,118,162 | B1 * | 2/2012 | McEwin | B25H 3/04 |
| | | | | 206/338 |

(Continued)

FOREIGN PATENT DOCUMENTS

| | | |
|---|---|---|
| CN | 104057459 A | 9/2014 |
| CN | 106586514 A | 4/2017 |

(Continued)

*Primary Examiner* — Timothy R Waggoner
(74) *Attorney, Agent, or Firm* — Yee & Associates, P.C.

(57) ABSTRACT

Fastener storage is presented. The fastener storage comprises a disc with a plurality of apertures through a first face of the disc and arranged in a plurality of rings concentric with the disc, and a plurality of machine-readable identifiers on the first face of the disc.

22 Claims, 8 Drawing Sheets

(56) References Cited

U.S. PATENT DOCUMENTS

| | | | |
|---|---|---|---|
| 8,479,913 | B2 | 7/2013 | Mazzini |
| 9,950,874 | B2 | 4/2018 | Kitamura |
| 9,965,839 | B2 | 5/2018 | Yasuda |
| 10,414,600 | B2 | 9/2019 | Oowatari |
| 10,507,987 | B2 | 12/2019 | Oowatari |
| 10,654,169 | B2 | 5/2020 | Oowatari |
| 2006/0057239 | A1 | 3/2006 | Hariki et al. |
| 2010/0063629 | A1 | 3/2010 | Battisti et al. |
| 2011/0174593 | A1 | 7/2011 | Mazzini |
| 2016/0060047 | A1 | 3/2016 | Kitamura |
| 2016/0063693 | A1 | 3/2016 | Yasuda |
| 2017/0348857 | A1* | 12/2017 | Vasquez ................ B23P 19/001 |
| 2018/0334336 | A1 | 11/2018 | Oowatari |
| 2019/0022869 | A1 | 1/2019 | Oowatari |
| 2019/0023501 | A1 | 1/2019 | Oowatari |
| 2019/0366328 | A1 | 12/2019 | Wang |
| 2021/0187676 | A1* | 6/2021 | Schroeder ................ B64F 5/10 |
| 2021/0270864 | A1 | 9/2021 | Chiappetta et al. |

FOREIGN PATENT DOCUMENTS

| | | | |
|---|---|---|---|
| CN | 106595487 | A | 4/2017 |
| DE | 202012009280 | U1 | 1/2013 |
| DE | 202021001085 | U1 | 4/2021 |
| EP | 3371078 | A1 | 9/2018 |
| JP | 2010142770 | A | 7/2010 |
| JP | 4930948 | B2 | 5/2012 |
| JP | 2015218047 | A | 12/2015 |
| JP | 6422237 | B2 | 11/2018 |
| WO | 2017076779 | A1 | 5/2017 |

* cited by examiner

800

| | |
|---|---|
| 802 | SPECIFICATION AND DESIGN |
| 804 | MATERIAL PROCUREMENT |
| 806 | COMPONENT AND SUBASSEMBLY MANUFACTURING |
| 808 | SYSTEM INTEGRATION |
| 810 | CERTIFICATION AND DELIVERY |
| 812 | IN SERVICE |
| 814 | MAINTENANCE AND SERVICE |

900

FASTENER STORAGE

CROSS-REFERENCE TO RELATED APPLICATION

This application claims the benefit of U.S. Provisional Patent Application Ser. No. 63/377,543, filed Sep. 29, 2022, and entitled "Fastener Storage," which is incorporated herein by reference in its entirety.

BACKGROUND INFORMATION

1. Field

The present disclosure relates generally to storing fasteners for manufacturing processes.

2. Background

In manufacturing processes, considerable time and energy is spent providing fasteners to end effectors. Fasteners are provided to the manufacturing floor in boxes by size. However, fasteners are disorganized within the boxes. Further, assembly of structures utilizes a variety of different sizes of fasteners.

Conventionally, fasteners are provided to end effectors one at a time by a series of tubes. Each tube is configured to provide a set diameter of fastener. However, fasteners exiting the tubes can have varied orientations. Additionally, fasteners can become lodged in tubes.

Therefore, it would be desirable to have a method and apparatus that takes into account at least some of the issues discussed above, as well as other possible issues. For example, it would be desirable to provide a mechanism for conveying fasteners without tubes.

SUMMARY

An embodiment of the present disclosure provides a fastener storage. The fastener storage comprises a disc with a plurality of apertures through a first face of the disc and arranged in a plurality of rings concentric with the disc, and a plurality of machine-readable identifiers on the first face of the disc.

An embodiment of the present disclosure provides a fastener storage. The fastener storage comprises a disc with a plurality of apertures through a first face of the disc and a plurality of machine-readable identifiers on the first face of the disc. The plurality of apertures has a plurality of aperture diameters. Each of the plurality of apertures has a respective aperture diameter with a clearance-fit to a predefined fastener.

Another embodiment of the present disclosure provides a method of storing a plurality of fasteners. The plurality of fasteners is placed shaft first into a set of apertures in a first face of a disc. Fastener size data is assigned to a set of machine-readable identifiers allocated to the set of apertures.

A further embodiment of the present disclosure provides a method of storing a fastener. The fastener is placed shaft first into an aperture in a first face of a disc such that a head of the fastener remains elevated above the first face. Fastener size data for the fastener is assigned to a machine-readable identifier allocated to the aperture.

Yet another embodiment of the present disclosure provides a method of forming a fastener storage. A design for a portion of a structure is analyzed for fastener quantity, fastener type, and fastener diameter of a plurality of fasteners in the design. A plurality of apertures is formed into a disc. The plurality of apertures has a plurality of aperture diameters selected to hold the plurality of fasteners based on at least one of the fastener diameter or the fastener type.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative examples recognize and take into account one or more different considerations. The illustrative examples recognize and take into account that some end effectors can pick up fasteners in varied orientations. The illustrative examples recognize and take into account that picking up fasteners in random orientations can take longer than picking up fasteners from a set orientation. The illustrative examples recognize and take into account that it would be desirable to provide fasteners at one set orientation. The illustrative examples recognize and take into account that by providing fasteners in a single orientation to fastening end effectors will reduce time spent picking up fasteners by the fastening end effector. In some illustrative examples, by providing fasteners in a single orientation, a design of a fastening end effector can be more flexible.

Figure 1:
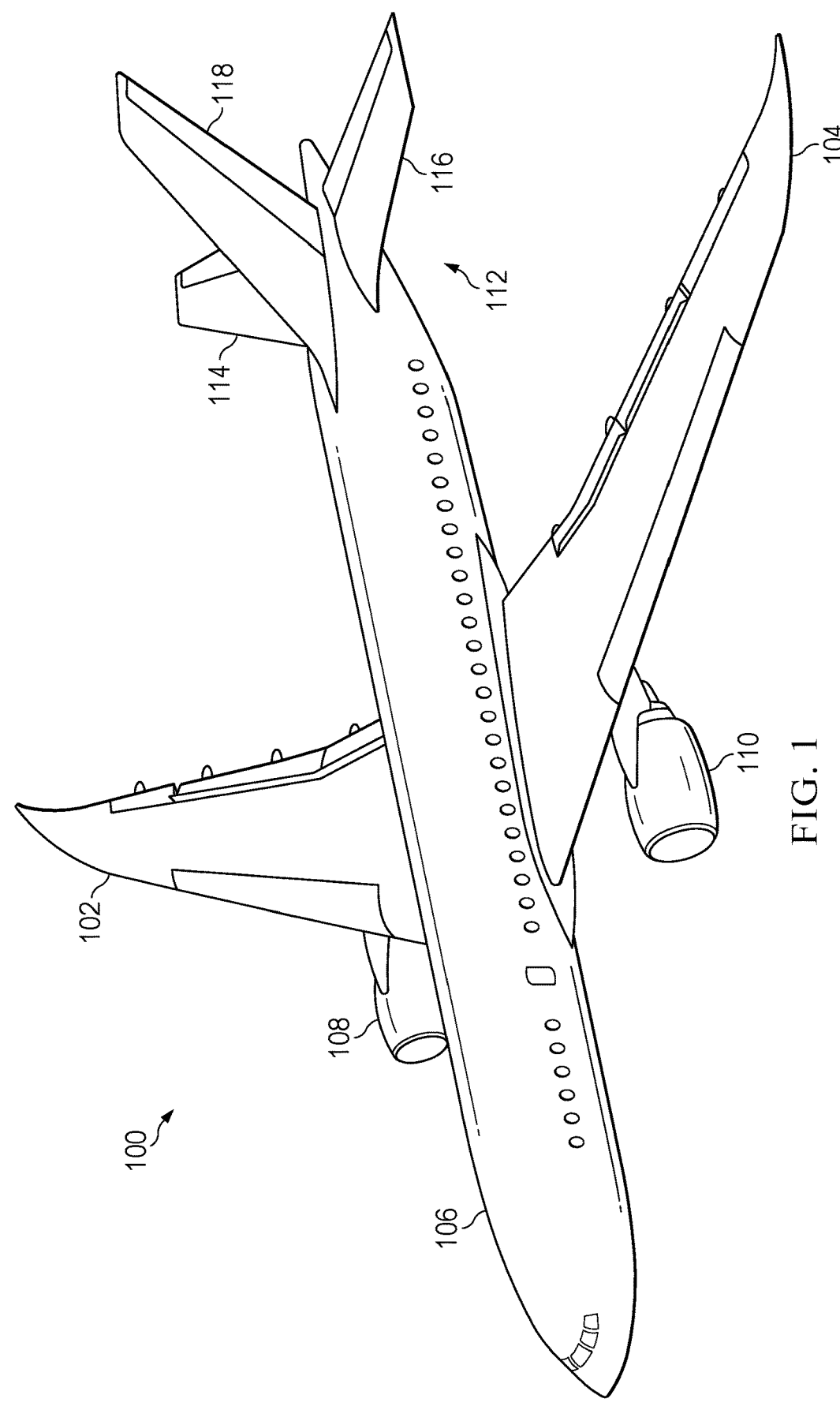
FIG. 1 is an illustration of an aircraft in which an illustrative embodiment may be implemented.

Turning now to FIG. 1, an illustration of an aircraft is depicted in accordance with an illustrative embodiment. Aircraft 100 has wing 102 and wing 104 attached to body 106. Aircraft 100 includes engine 108 attached to wing 102 and engine 110 attached to wing 104.

Body 106 has tail section 112. Horizontal stabilizer 114, horizontal stabilizer 116, and vertical stabilizer 118 are attached to tail section 112 of body 106.

Aircraft 100 is an example of a platform that can be manufactured using fasteners from a fastener storage of the illustrative examples. For example, portions of body 106, wing 102, or wing 104 can be manufactured using fastening end effectors that take fasteners from fastener storage of the illustrative examples.

Figure 2:
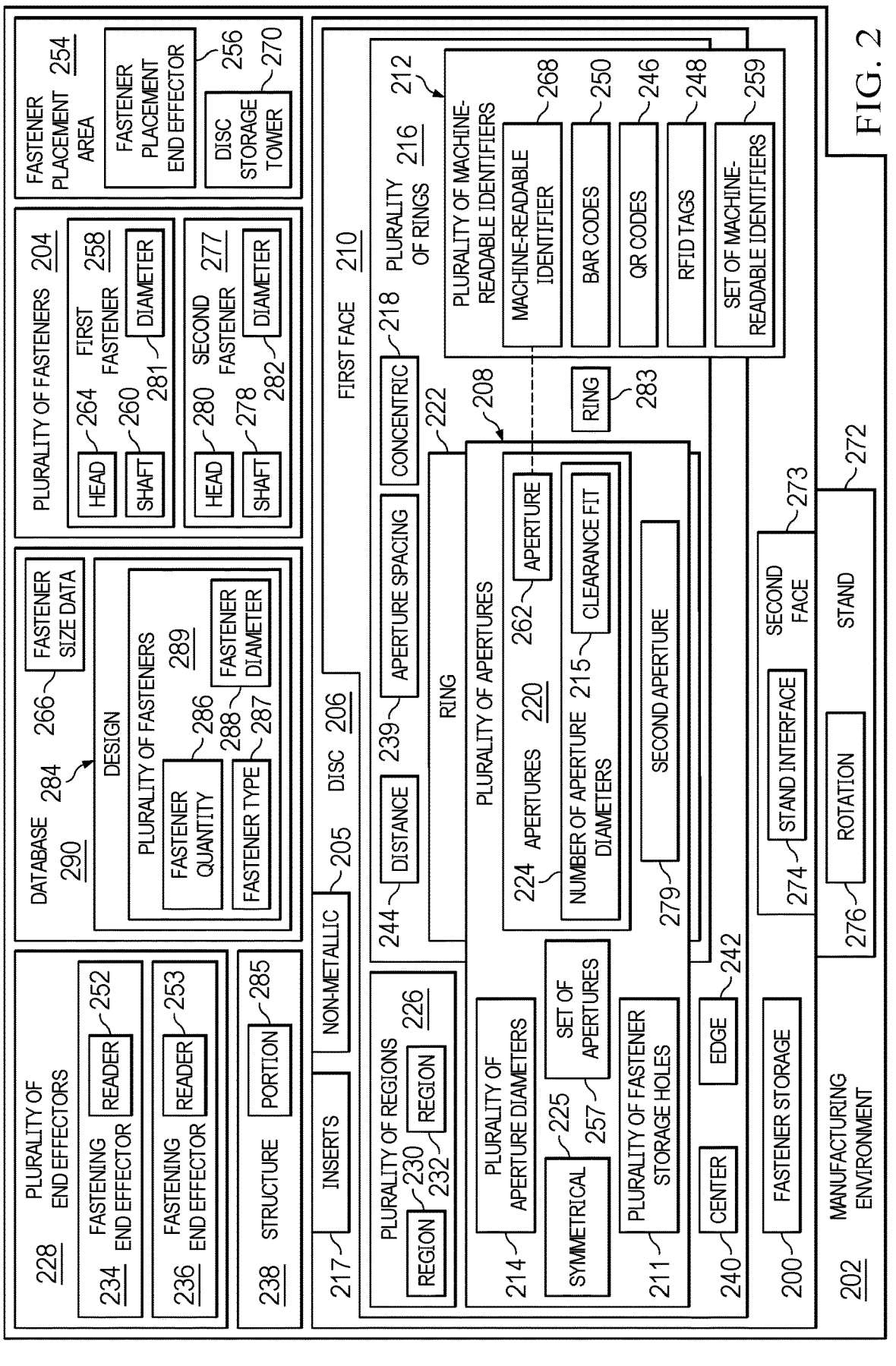
FIG. 2 is an illustration of a block diagram of a manufacturing environment in which an illustrative embodiment may be implemented.

Turning now to FIG. 2, an illustration of a block diagram of a manufacturing environment is depicted in which an illustrative embodiment may be implemented. Fastener storage 200 is used within manufacturing environment 202 to store plurality of fasteners 204. Fastener storage 200 provides storage of plurality of fasteners 204 without delivery tubes. Fastener storage 200 comprises disc 206 with plurality of apertures 208 through first face 210 of disc 206 and plurality of machine-readable identifiers 212 on first face 210 of disc 206. In some illustrative examples, plurality of apertures 208 can be referred to as plurality of fastener storage holes 211. In some illustrative examples, plurality of apertures 208 has plurality of aperture diameters 214, and each of plurality of apertures 208 having a respective aperture diameter with clearance-fit 215 to a predefined fastener.

By having a clearance-fit 215, the respective aperture is able to hold a respective fastener in a single orientation without undesirably affecting the fastener. In some illustrative examples, disc 206 is non-metallic 205. When disc 206 is non-metallic 205, clearance-fit 215 of the respective aperture does not undesirably affect the fastener. In some other illustrative examples, disc 206 is metallic and inserts 217 within plurality of apertures 208 are non-metallic 205. In these illustrative examples, inserts 217 are secured to disc 206 within plurality of apertures 208. In these illustrative examples, inserts 217 are clearance-fit 215 with a respective fastener. In this illustrative examples, clearance-fit 215 of the respective insert does not undesirably affect the fastener.

Plurality of apertures 208 is through first face 210 of disc 206 and arranged in plurality of rings 216 concentric 218 with disc 206. In some illustrative examples, plurality of apertures 208 comprises a single respective aperture diameter in each ring of plurality of rings 216. Apertures 220 of ring 222 in plurality of rings 216 have number of aperture diameters 224. In illustrative examples in which a single respective aperture diameter is in each ring of plurality of rings 216, number of aperture diameters 224 comprises a single aperture diameter. In some illustrative examples, plurality of apertures 208 comprises more than one aperture diameter in at least one ring of plurality of rings 216. In some illustrative examples, plurality of apertures 208 is symmetrical 225. In other illustrative examples, plurality of apertures 208 is asymmetrically placed in disc 206. In some illustrative examples, plurality of apertures 208 comprises plurality of aperture diameters 214.

In some illustrative examples, an innermost ring of plurality of rings 216 has a smallest aperture diameter of plurality of aperture diameters 214. In some illustrative examples, an innermost ring of plurality of rings 216 has a largest aperture diameter of plurality of aperture diameters 214.

In some illustrative examples, disc 206 can be considered as formed of plurality of regions 226. Plurality of regions 226 can be identified to allow plurality of end effectors 228 to remove fasteners from a same fastener storage 200, disc 206. For example, plurality of regions 226 can include region 230 and region 232. In some illustrative examples, fastening end effector 234 of plurality of end effectors 228 can use fasteners from region 230 of plurality of regions 226. In these illustrative examples, the fasteners within region 230 are selected based on the types of fasteners for the portion of structure 238 to be worked on by fastening end effector 234.

In some illustrative examples, fastening end effector 236 of plurality of end effectors 228 can use fasteners from region 232 of plurality of regions 226. In these illustrative examples, the fasteners within region 232 are selected based on the types of fasteners for the portion of structure 238 to be worked on by fastening end effector 236.

Each machine-readable identifier of plurality of machine-readable identifiers 212 is associated with a respective aperture of plurality of apertures 208. In some illustrative examples, plurality of machine-readable identifiers 212 are alternated with plurality of apertures 208 in plurality of rings 216. In these illustrative examples, plurality of machine-readable identifiers 212 can be referred to as "beside" plurality of apertures 208.

In these illustrative examples, plurality of machine-readable identifiers 212 are positioned between plurality of apertures 208 in plurality of rings 216. In these illustrative examples, aperture spacing 239 in each ring of the plurality of rings 216 is large enough to have a respective machine-readable identifier of the plurality of machine-readable identifiers.

In some illustrative examples, each of plurality of machine-readable identifiers 212 is positioned closer to center 240 of first face 210 than a respective aperture of plurality of apertures 208. In some illustrative examples, each of plurality of machine-readable identifiers 212 is positioned closer to edge 242 of first face 210 than a respective aperture of plurality of apertures 208. In some illustrative examples, distance 244 between plurality of rings 216 is large enough to accommodate plurality of machine-readable identifiers 212 between plurality of rings 216.

Plurality of machine-readable identifiers 212 takes any desirable form. In some illustrative examples, plurality of machine-readable identifiers 212 comprises QR codes 246. In some illustrative examples, plurality of machine-readable identifiers 212 comprises RFID tags 248. In some illustrative examples, plurality of machine-readable identifiers 212 comprises bar codes 250.

Fastening end effector 234 has reader 252 configured to scan plurality of machine-readable identifiers 212. Fastening end effector 236 has reader 253 configured to scan plurality of machine-readable identifiers 212. By scanning a machine-readable identifier by a reader of a fastening end effector, such as reader 253 of fastening end effector 236, the fastening end effector acquires information regarding the size and elevation of the fastener in the aperture. By scanning a machine-readable identifier by a reader of a fastening end effector, such as reader 253 of fastening end effector 236, the fastening end effector verifies the location contains a desired fastener.

Disc 206 is moved to fastener placement area 254 in manufacturing environment 202 to receive plurality of fasteners 204. In fastener placement area 254, fastener placement end effector 256 takes plurality of fasteners 204 from fastener boxes and places plurality of fasteners 204 into disc 206 shaft first. For example, fastener placement end effector 256 places first fastener 258 into disc 206 shaft 260 first.

Fastener placement end effector 256 places plurality of fasteners 204 shaft first into set of apertures 257 in first face 210 of disc 206. Set of apertures 257 is a subset of plurality of apertures 208. Fastener size data 266 for plurality of fasteners 204 is assigned to set of machine-readable identifiers 259 allocated to set of apertures 257.

Fastener placement end effector 256 places first fastener 258 shaft 260 first into aperture 262 in first face 210 of disc 206 such that head 264 of first fastener 258 remains elevated above first face 210. After placing first fastener 258 into aperture 262, fastener size data 266 for the fastener is assigned to machine-readable identifier 268 allocated to aperture 262.

In some illustrative examples, after placing first fastener 258 into aperture 262, disc 206 with first fastener 258 into disc storage tower 270. Disc storage tower 270 can store multiple discs with fasteners in a vertical stack. In some illustrative examples, disc storage tower 270 is moveable within manufacturing environment 202, and is used to transport disc 206 within manufacturing environment 202. In some illustrative examples, disc storage tower 270 is used to transport disc 206 with first fastener 258 from fastener placement area 254 to within reach of at least one of plurality of end effectors 228.

In some illustrative examples, disc 206 with first fastener 258 is moved within reach of fastening end effector 234. In some illustrative examples, disc 206 is moved within manufacturing environment 202 using stand 272. Second face 273 of disc 206 is opposite first face 210 of disc 206. In some illustrative examples, stand interface 274 is on second face 273 of disc 206. Stand interface 274 is configured to connect disc 206 to stand 272.

In some illustrative examples, stand 272 enables rotation 276 of disc 206. Rotation 276 of disc 206 allows for plurality of end effectors 228 to reach fasteners in disc 206.

In some illustrative examples, second fastener 277 is placed shaft 278 first into second aperture 279 in first face 210 of disc 206 such that head 280 of second fastener 277 remains elevated above first face 210. In some illustrative examples, second fastener 277 has a different diameter from first fastener 258. In these illustrative examples, diameter 281 of first fastener 258 is different from diameter 282 of second fastener 277. In some illustrative examples, diameter 281 of first fastener 258 is the same as diameter 282 of second fastener 277.

In some illustrative examples, aperture 262 and second aperture 279 are in the same ring. As depicted, aperture 262 and second aperture 279 are in ring 222. In other illustrative examples, aperture 262 and second aperture 279 are in different rings of plurality of rings 216. In some illustrative examples, aperture 262 is in ring 222 while second aperture 279 is in a different ring, such as ring 283.

In some illustrative examples, disc 206 is created based on design 284 of structure 238. In some illustrative examples, a quantity of apertures in plurality of apertures 208 and plurality of aperture diameters 214 are selected based on fasteners to be used in structure 238. In some illustrative examples, disc 206 is one of a plurality of fastener storage discs. In some illustrative examples, each fastener storage disc is configured to hold fasteners for a predetermined region of structure 238. In some illustrative examples, disc 206 has a different layout of plurality of apertures 208 than another fastener storage disc configured to be used in manufacturing structure 238.

In some illustrative examples, design 284 for portion 285 of structure 238 is analyzed for fastener quantity 286, fastener type 287, and fastener diameter 288 of plurality of fasteners 289 in design 284. In some illustrative examples, plurality of apertures 208 is formed into disc 206, plurality of apertures 208 having plurality of aperture diameters 214 selected to hold plurality of fasteners 204 based on at least one of fastener diameter 288 or fastener type 287.

Plurality of apertures 208 is formed in disc 206 using any desirable method. In some illustrative examples, plurality of apertures 208 is formed in disc 206 using one of machining, molding, or additive manufacturing. In some illustrative examples, forming plurality of apertures 208 comprises forming plurality of apertures 208 into plurality of rings 216 concentric with disc 206. For example, plurality of rings 216 is concentric around center 240 of first face 210.

In some illustrative examples, a quantity of apertures with each aperture diameter of plurality of aperture diameters 214 is selected based on fastener quantity 286 of design 284. In some illustrative examples, plurality of apertures 208 comprises a sufficient quantity of apertures of each aperture diameter to store plurality of fasteners 289.

As depicted, design 284 of structure 238 and fastener size data 266 are stored within database 290. In other illustrative examples, design 284 of structure 238 and fastener size data 266 can be stored in separate databases. Database 290 can take any desirable form.

The illustration of manufacturing environment 202 in FIG. 2 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, although plurality of fasteners 204 is depicted with two fasteners, first fastener 258 and second fastener 277, plurality of fasteners 204 can comprise any quantity of fasteners. As another example, plurality of machine-readable identifiers 212 can take the form of another machine-readable identifier other than bar codes 250, QR codes 246, or RFID tags 248.

Figure 3:
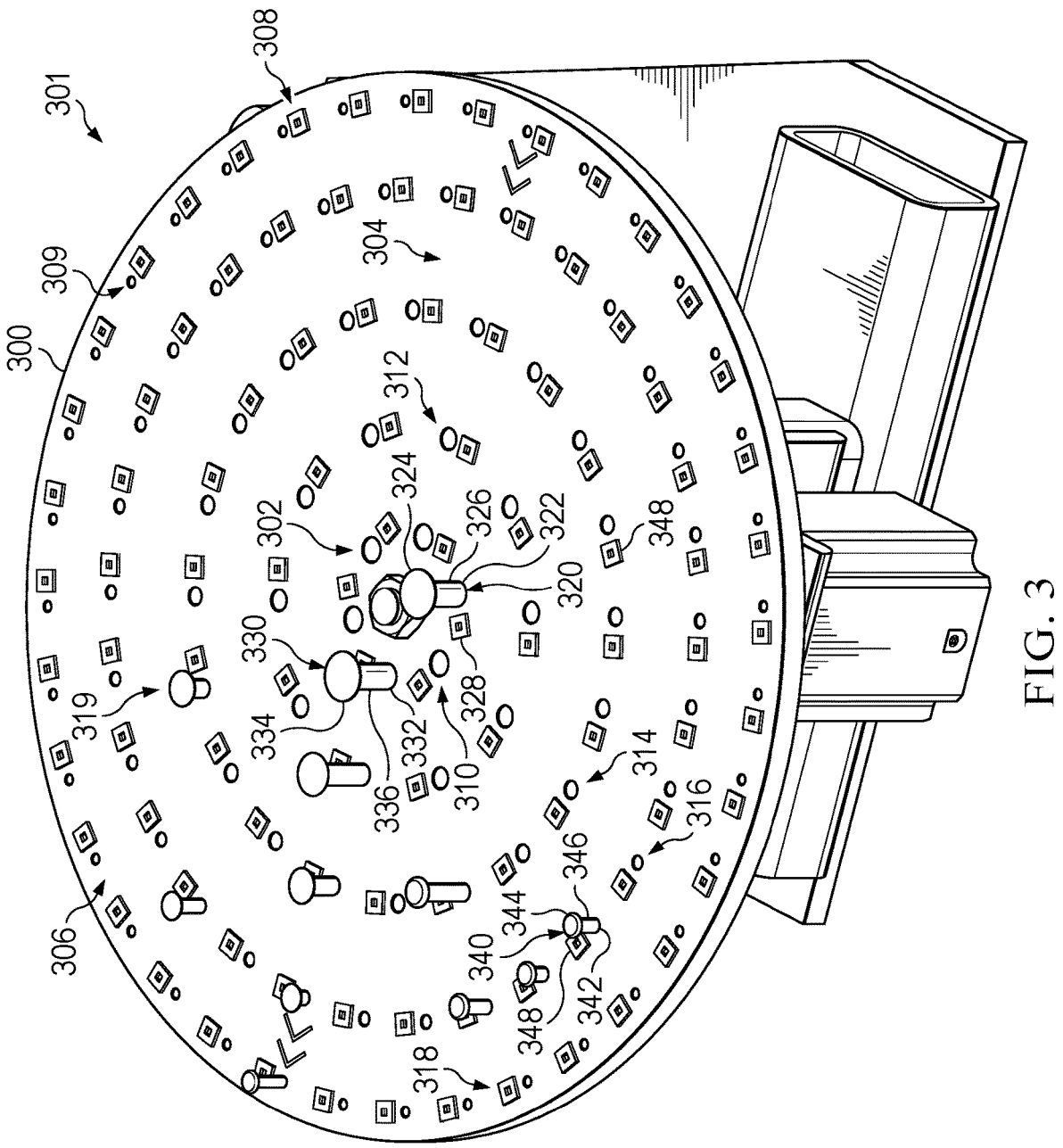
FIG. 3 is an illustration of an isometric view of a fastener storage in accordance with an illustrative embodiment.

Turning now to FIG. 3, an illustration of an isometric view of a fastener storage is depicted in accordance with an illustrative embodiment. Fastener storage 301 comprises disc 300. Disc 300 is a physical implementation of disc 206 of FIG. 2. Disc 300 provides storage for plurality of fasteners 319 without delivery tubes. Disc 300 has plurality of apertures 302 through first face 304 and arranged in plurality of rings 306 concentric with disc 300. Plurality of machine-readable identifiers 308 is on first face 304 of disc 300.

Each of plurality of machine-readable identifiers 308 is associated with a respective aperture of plurality of apertures 302. As depicted, plurality of machine-readable identifiers 308 is positioned in plurality of rings 306.

As depicted, plurality of apertures 302 comprises plurality of aperture diameters 309. As depicted, plurality of apertures comprises a single respective aperture diameter in each ring of plurality of rings 306. As depicted, plurality of rings 306 comprises ring 310, ring 312, ring 314, ring 316, and ring 318. As depicted, each ring of plurality of rings 306 comprises its own aperture diameter.

As depicted, innermost ring, ring 310, of plurality of rings 306 has a largest aperture diameter of plurality of aperture diameters 309. As depicted, outermost ring, ring 318, of plurality of rings 306 has a smallest aperture diameter of plurality of aperture diameters 309. As depicted, plurality of apertures 302 is symmetrical.

As depicted, plurality of machine-readable identifiers 308 are alternated with plurality of apertures 302. Plurality of machine-readable identifiers 308 comprises at least one of bar codes, QR codes, or RFID tags. As depicted, aperture spacing within each of plurality of rings 306 is sufficient to contain a respective machine-readable identifier of machine-readable identifiers 308.

Plurality of fasteners 319 is stored in disc 300. Plurality of fasteners 319 includes fastener 320. As depicted, fastener 320 is present in aperture 322 of ring 310. Head 324 of fastener 320 is elevated above first face 304. Fastener 320 was inserted into aperture 322 shaft 326 first such that head 324 is elevated above disc 300. Machine-readable identifier 328 is allocated to aperture 322. Machine-readable identifier 328 has assigned fastener size data specific to fastener 320. The assigned fastener size data includes a distance head 324 is elevated above disc 300.

Fastener 330 is present in aperture 332 of ring 310. Head 334 of fastener 330 is elevated above first face 304. Fastener 330 was inserted into aperture 332 shaft 336 first such that head 334 is elevated above disc 300. A machine-readable identifier (not visible) is allocated to aperture 332. The machine-readable identifier (not visible) has assigned fastener size data specific to fastener 330. The assigned fastener size data includes a distance head 334 is elevated above disc 300.

In this illustrative example, fastener 320 and fastener 330 have a same diameter. In this illustrative example, head 324 and head 334 are also a same distance elevated above first face 304. In other non-depicted examples, fasteners can have the same diameter, but different lengths. In other non-depicted examples, fasteners of the same diameter could be present in the same ring but have heads with different elevations above first face 304.

In this illustrative example, fastener 340 is present in aperture 342 of ring 316. Head 344 of fastener 340 is elevated above first face 304. Fastener 340 was inserted into aperture 342 shaft 346 first such that head 344 is elevated above disc 300. Machine-readable identifier 348 is allocated to aperture 342. Machine-readable identifier 348 has assigned fastener size data specific to fastener 340. The assigned fastener size data includes a distance head 344 is elevated above disc 300. As depicted, fastener 340 has a smaller diameter than fastener 320 and fastener 330.

The illustration of disc 300 in FIG. 3 is not meant to imply physical or architectural limitations to the manner in which an illustrative embodiment may be implemented. Other components in addition to or in place of the ones illustrated may be used. Some components may be unnecessary.

For example, although plurality of apertures 302 is depicted as symmetrical, in other non-depicted examples, plurality of apertures 302 can be asymmetrical. As another example, in some non-depicted examples, innermost ring, ring 310, of plurality of rings 306 has a smallest aperture diameter of plurality of aperture diameters 309. In some non-depicted examples, plurality of aperture diameters 309 of plurality of rings 306 are not organized by size. In some non-depicted examples, at least one ring of plurality of rings 306 has more than one aperture diameter.

In this depicted example, disc 300 is in contact with plurality of fasteners. In this illustrative example, disc 300 is formed of a non-metallic material. Although plurality of apertures 302 is depicted as having a clearance fit with plurality of fasteners 319, in some non-depicted illustrative examples, inserts are present in plurality of apertures 302. In these non-depicted illustrative examples, the inserts are formed of non-metallic material and are secured within plurality of apertures 302. In these non-depicted examples, the inserts have a clearance fit with plurality of fasteners 319.

Figure 4:
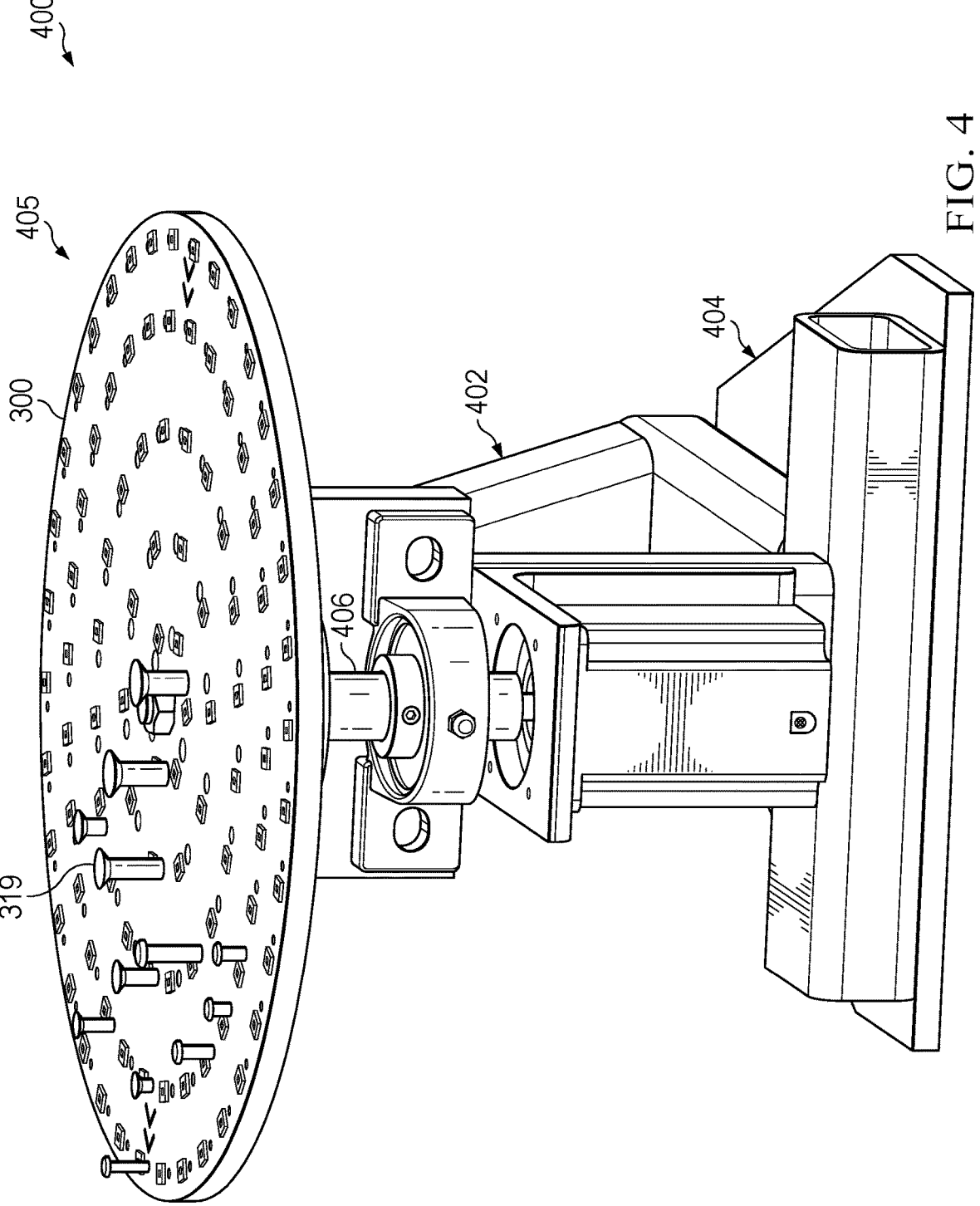
FIG. 4 is an illustration of an isometric view of a fastener storage in accordance with an illustrative embodiment.

Turning now to FIG. 4, an illustration of an isometric view of a fastener storage is depicted in accordance with an illustrative embodiment. View 400 is a view of disc 300 on stand 402. As depicted, stand 402 has base 404 to position disc 300 within manufacturing environment 405. Disc 300 is connected to base 404 by spindle 406. Spindle 406 enables rotation of disc 300. By rotating disc 300 on stand 402, plurality of fasteners 319 are accessible by a fastening end effector.

Figure 5:
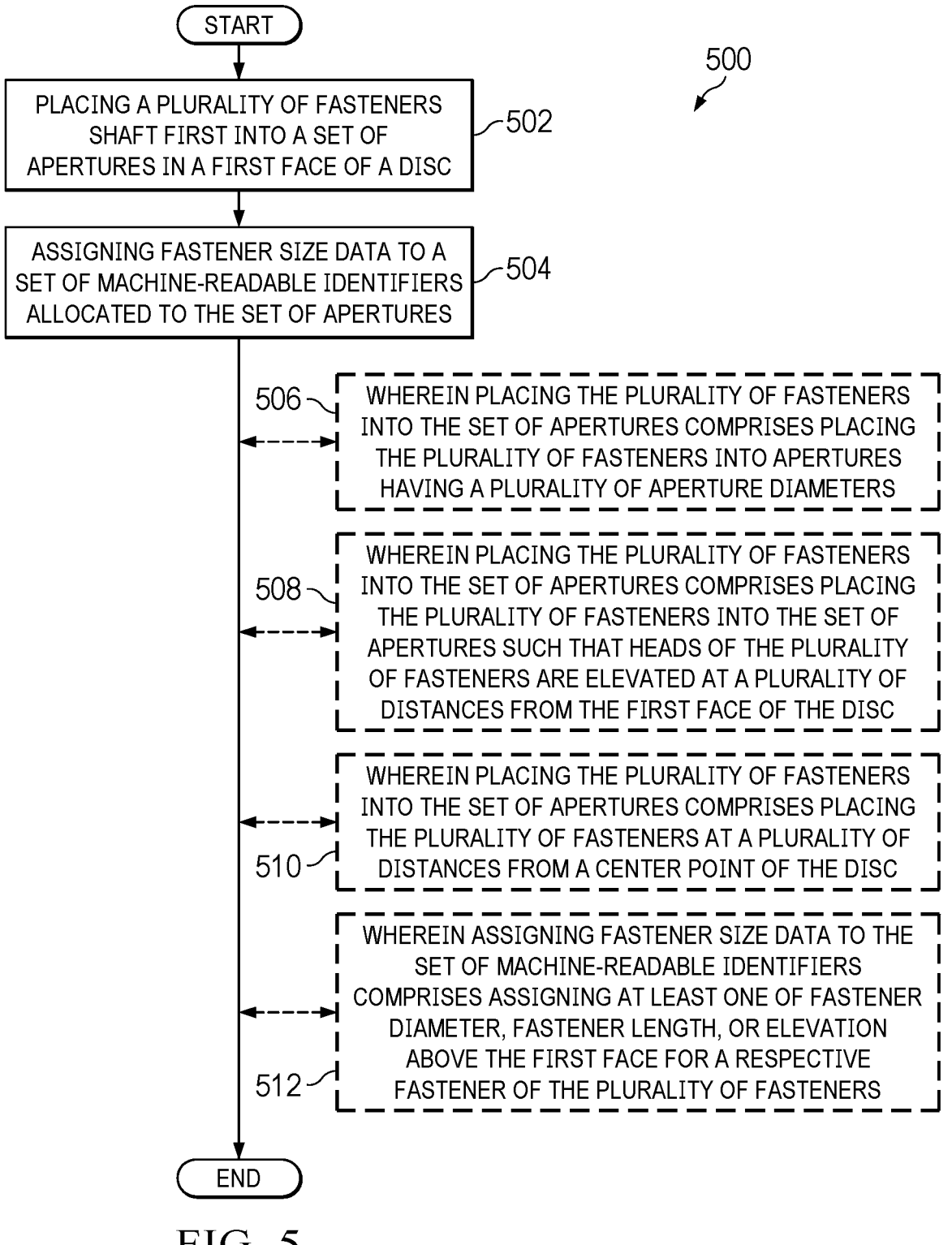
FIG. 5 is a flowchart of a method of storing a plurality of fasteners in accordance with an illustrative embodiment.

Turning now to FIG. 5, a flowchart of a method of storing a plurality of fasteners is depicted in accordance with an illustrative embodiment. Method 500 can be used to store plurality of fasteners 204 in fastener storage 200 in FIG. 2. Method 500 can be used to store plurality of fasteners 319 in fastener storage 301 of FIGS. 3-4.

Method 500 places a plurality of fasteners shaft first into a set of apertures in a first face of a disc (operation 502). Method 500 assigns fastener size data to a set of machine-readable identifiers allocated to the set of apertures (operation 504). Afterwards, method 500 terminates.

In some illustrative examples, placing the plurality of fasteners into the set of apertures comprises placing the plurality of fasteners into apertures having a plurality of aperture diameters (operation 506). In some illustrative examples, placing the plurality of fasteners into the set of apertures comprises placing the plurality of fasteners into the set of apertures such that heads of the plurality of fasteners are elevated at a plurality of distances from the first face of the disc (operation 508). In some illustrative examples, placing the plurality of fasteners into the set of apertures comprises placing the plurality of fasteners at a plurality of distances from a center of the first face (operation 510).

In some illustrative examples, assigning fastener size data to the set of machine-readable identifiers comprises assigning at least one of fastener diameter, fastener length, or elevation above the first face for a respective fastener of the plurality of fasteners (operation 512). A reader of a fastening end effector can verify a desired type and size of fastener is present in an aperture by reading fastener size data from a respective machine-readable identifier.

Figure 6:
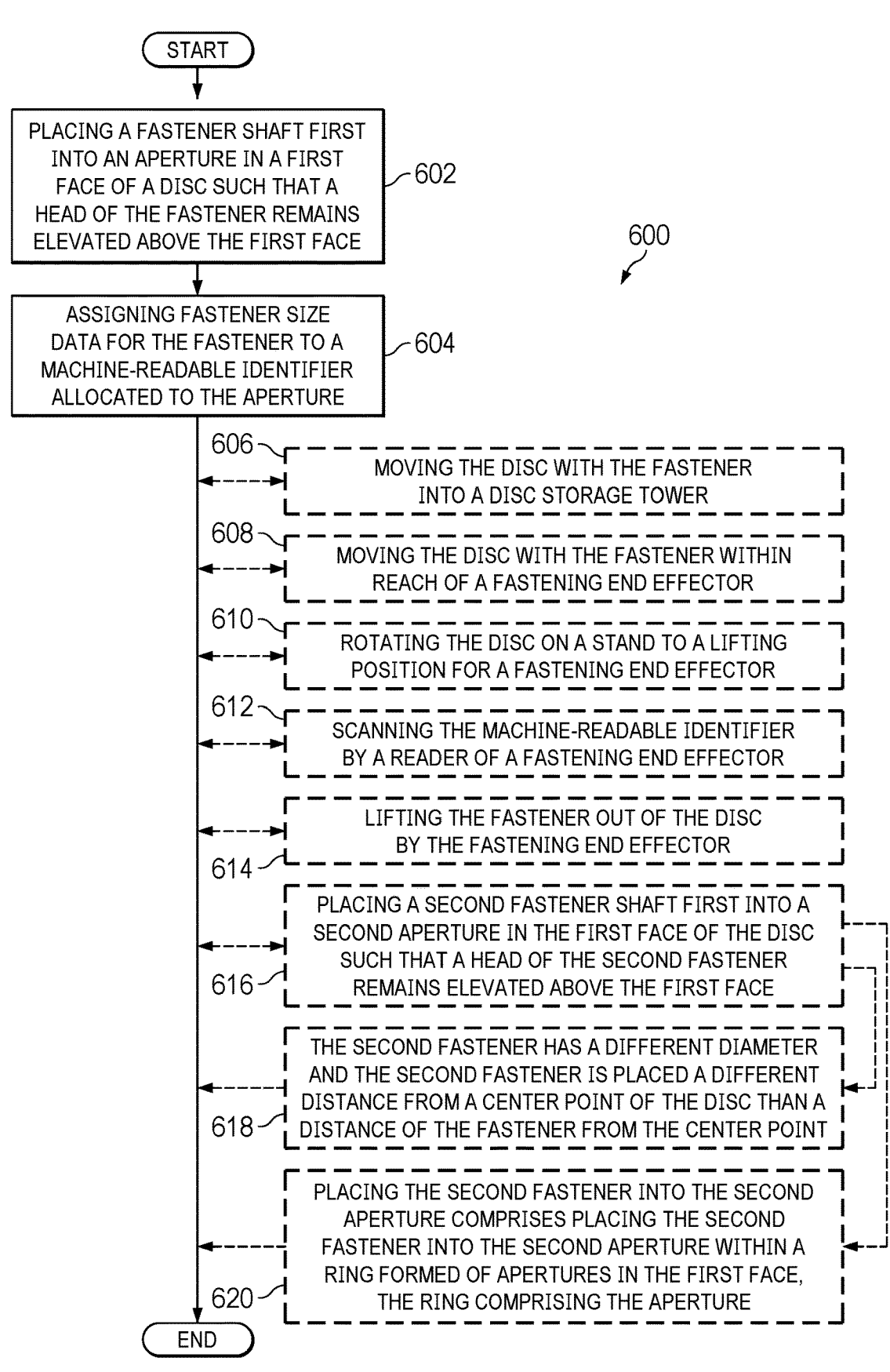
FIG. 6 is a flowchart of a method of storing a fastener in accordance with an illustrative embodiment.

Turning now to FIG. 6, a flowchart of a method of storing a fastener is depicted in accordance with an illustrative embodiment. Method 600 can be used to store plurality of fasteners 204 in fastener storage 200 in FIG. 2. Method 600 can be used to store plurality of fasteners 319 in fastener storage 301 of FIGS. 3-4.

Method 600 places a fastener shaft first into an aperture in a first face of a disc such that a head of the fastener remains elevated above the first face (operation 602). Method 600 assigns fastener size data for the fastener to a machine-readable identifier allocated to the aperture (operation 604). Afterwards, method 600 terminates.

In some illustrative examples, method 600 moves the disc with the fastener into a disc storage tower (operation 606). A disc storage tower can store a plurality of fastener storage discs with or without fasteners stored. In some illustrative examples, a disc storage tower can be transported to a region of a manufacturing environment with fasteners for a portion of a structure within the region of the manufacturing environment.

In some illustrative examples, method 600 moves the disc with the fastener within reach of a fastening end effector (operation 608). The disc can be moved within a manufacturing environment using any desirable method and equipment. In some illustrative examples, the disc is moved within the manufacturing environment using a robotic arm or a gantry. In some illustrative examples, the disc is moved within a manufacturing environment using a moveable stand.

In some illustrative examples, method 600 rotates the disc on a stand to a lifting position for a fastening end effector (operation 610). In some illustrative examples, the lifting position is a position in which a fastening end effector can reach fasteners for operations to be performed by the fastening end effector.

In some illustrative examples, method 600 scans the machine-readable identifier by a reader of a fastening end effector (operation 612). Scanning the machine-readable identifier by a reader of a fastening end effector acquires information regarding the size and elevation of the fastener in the aperture. A reader of a fastening end effector can verify a desired type and size of fastener is present in an aperture by reading fastener size data from a respective machine-readable identifier. In some illustrative examples, the machine-readable identifier is one of a bar code, a QR code, or a RFID tag.

In some illustrative examples, method 600 lifts the fastener out of the disc by the fastening end effector (operation 614). The fastening end effector lifts the fastener out of the disc by grasping the fastener by the head of the fastener.

In some illustrative examples, method 600 places a second fastener shaft first into a second aperture in the first face of the disc such that a head of the second fastener remains elevated above the first face (operation 616). In some illustrative examples, the second fastener has a different diameter and the second fastener is placed a different distance from a center of the first face than a distance of the fastener from the center (operation 618). In some illustrative examples, placing the second fastener into the second aperture comprises placing the second fastener into the second aperture within a ring formed of apertures in the first face, the ring comprising the aperture (operation 620).

Figure 7:
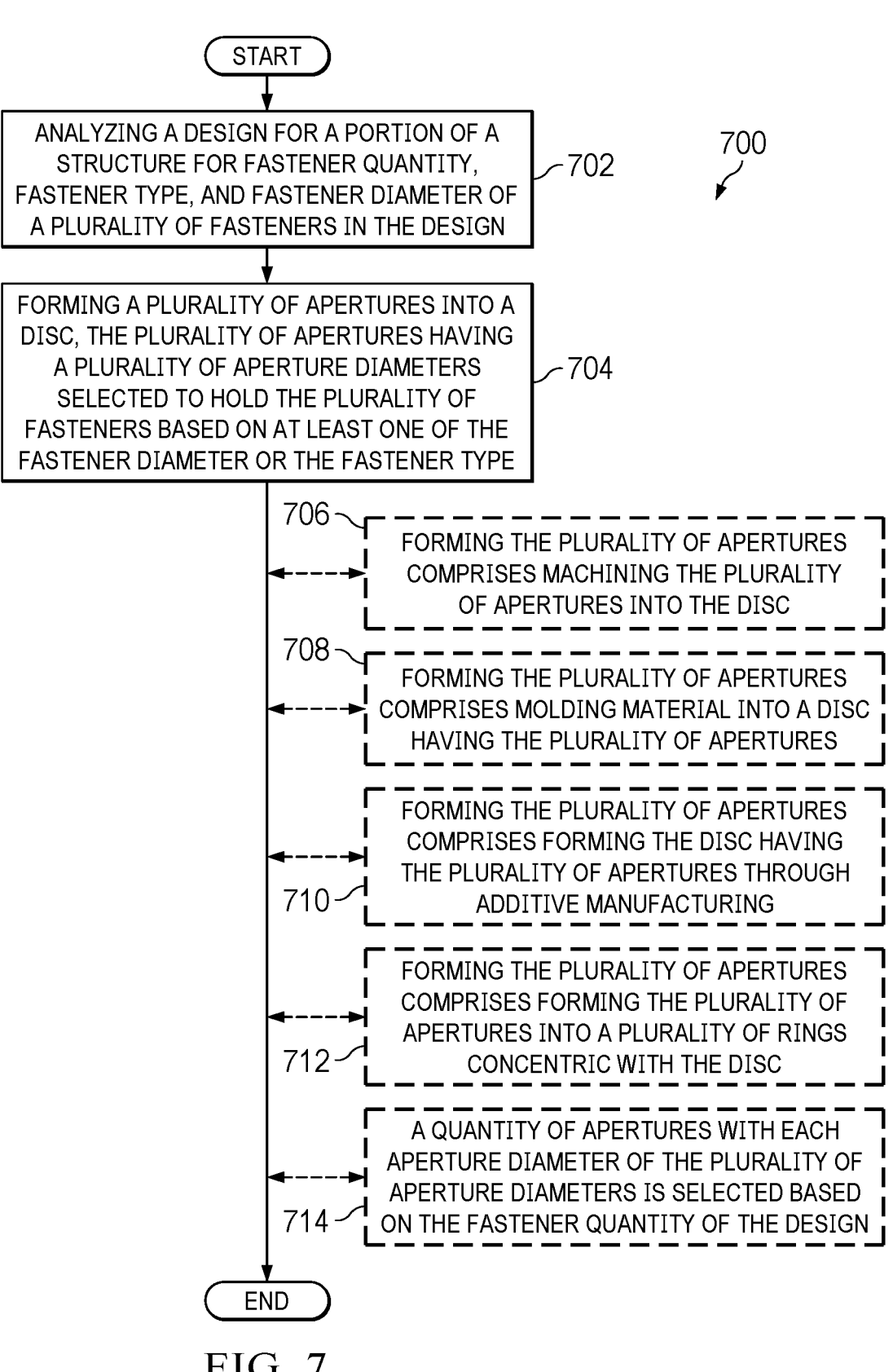
FIG. 7 is a flowchart of a method of forming a fastener storage in accordance with an illustrative embodiment.

Turning now to FIG. 7, an illustration of a flowchart of a method of forming a fastener storage is depicted in accordance with an illustrative embodiment. Method 700 can be used to design fastener storage 200 of FIG. 2. Method 700 can be used to design fastener storage 301 of FIGS. 3-4.

Method 700 analyzes a design for a portion of a structure for fastener quantity, fastener type, and fastener diameter of a plurality of fasteners in the design (operation 702). Method 700 forms a plurality of apertures into a disc, the plurality of apertures having a plurality of aperture diameters selected to hold the plurality of fasteners based on at least one of the fastener diameter or the fastener type (operation 704). Afterwards, method 700 terminates.

In some illustrative examples, forming the plurality of apertures comprises machining the plurality of apertures into the disc (operation 706).

In some illustrative examples, forming the plurality of apertures comprises molding material into a disc having the plurality of apertures (operation 708).

In some illustrative examples, forming the plurality of apertures comprises forming the disc having the plurality of apertures through additive manufacturing (operation 710). In some illustrative examples, forming the plurality of apertures comprises forming the plurality of apertures into a plurality of rings concentric with the disc (operation 712). In some illustrative examples, a quantity of apertures with each aperture diameter of the plurality of aperture diameters is selected based on the fastener quantity of the design (operation 714).

As used herein, the phrase "at least one of," when used with a list of items, means different combinations of one or more of the listed items may be used and only one of each item in the list may be needed. For example, "at least one of item A, item B, or item C" may include, without limitation, item A, item A and item B, or item B. This example also may include item A, item B, and item C or item B and item C. Of course, any combinations of these items may be present. In other examples, "at least one of" may be, for example, without limitation, two of item A; one of item B; and ten of item C; four of item B and seven of item C; or other suitable combinations. The item may be a particular object, thing, or a category. In other words, at least one of means any combination items and number of items may be used from the list but not all of the items in the list are required.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram. Some blocks may be optional. For example, any of operation 506 through operation 512 may be optional. As another example, any of operation 606 through operation 620 may be optional. As another example, any of operation 706 through operation 714 may be optional.

Figure 8:
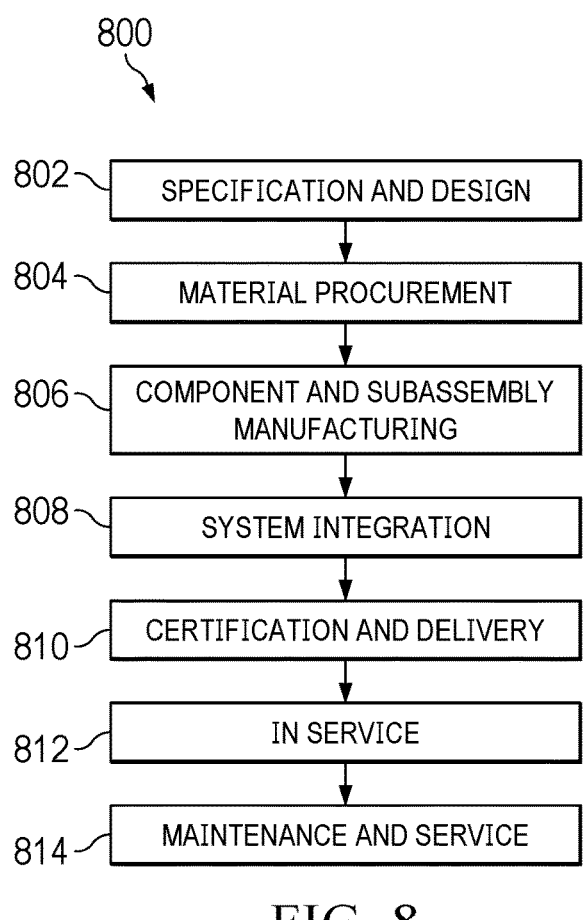
FIG. 8 is an illustration of an aircraft manufacturing and service method in a form of a block diagram in accordance with an illustrative embodiment.
Figure 9:
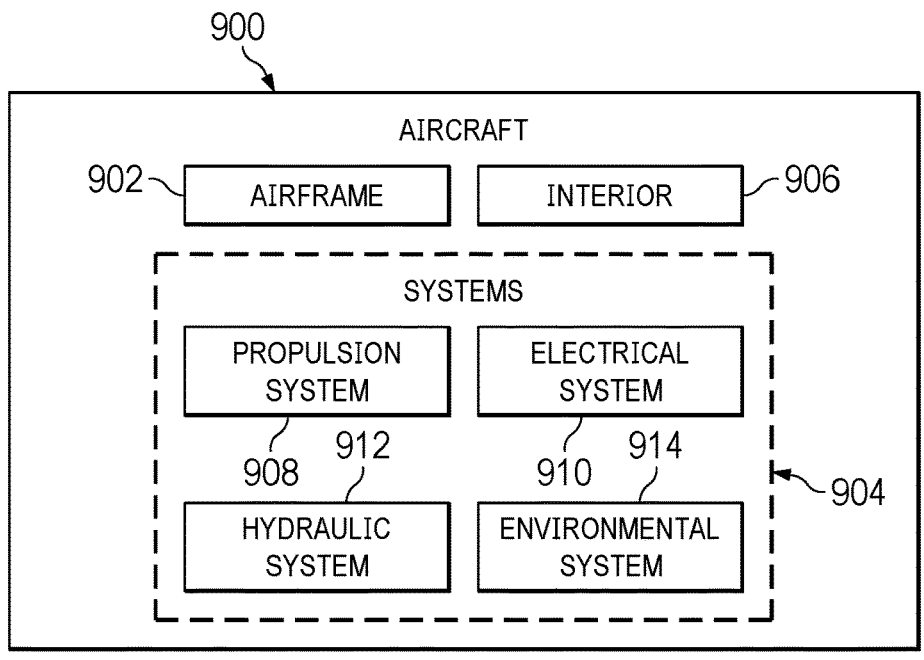
FIG. 9 is an illustration of an aircraft in a form of a block diagram in which an illustrative embodiment may be implemented.

Illustrative embodiments of the present disclosure may be described in the context of aircraft manufacturing and service method 800 as shown in FIG. 8 and aircraft 900 as shown in FIG. 9. Turning first to FIG. 8, an illustration of an aircraft manufacturing and service method is depicted in accordance with an illustrative embodiment. During pre-production, aircraft manufacturing and service method 800 may include specification and design 802 of aircraft 900 in FIG. 9 and material procurement 804.

During production, component and subassembly manufacturing 806 and system integration 808 of aircraft 900 takes place. Thereafter, aircraft 900 may go through certification and delivery 810 in order to be placed in service 812. While in service 812 by a customer, aircraft 900 is scheduled for routine maintenance and service 814, which may include modification, reconfiguration, refurbishment, or other maintenance and service.

Each of the processes of aircraft manufacturing and service method 800 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 9, an illustration of an aircraft is depicted in which an illustrative embodiment may be implemented. In this example, aircraft 900 is produced by aircraft manufacturing and service method 800 of FIG. 8 and may include airframe 902 with plurality of systems 904 and interior 906. Examples of systems 904 include one or more of propulsion system 908, electrical system 910, hydraulic system 912, and environmental system 914. Any number of other systems may be included.

Apparatuses and methods embodied herein may be employed during at least one of the stages of aircraft manufacturing and service method 800. One or more illustrative embodiments may be manufactured or used during at least one of component and subassembly manufacturing 806, system integration 808, in service 812, or maintenance and service 814 of FIG. 8.

A portion of airframe 902 of aircraft 900 can be formed using fasteners stored in method 500 of FIG. 5 or method 600 of FIG. 6. A portion of airframe 902 of aircraft 900 can be formed using fasteners stored in a fastener storage disc manufactured using method 700 of FIG. 7.

Method 500 of FIG. 5 or method 600 of FIG. 6 can be performed during component and subassembly manufacturing 806. Disc 206 can be used to store fasteners to be used during component and subassembly manufacturing 806. Fasteners stored in disc 206 are present and utilized during in service 812. Method 500 of FIG. 5 or method 600 of FIG. 6 can be performed during maintenance and service 814 to form a replacement part.

The illustrative examples provide a fastener storage without the usage of delivery tubes. The fastener storage provides a delivery system for use with robotic fastening end effectors. In some illustrative examples, the fastener storage can be used with Outside Mould Line (OML) robotic fastening end effectors. In this robotic fastening process, a disc is used to store different sizes and types of fasteners. In some illustrative examples, the disc is on a rotating standing. In some illustrative examples, the rotating disc storage mechanism provides selective picking of the designated fastener.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A fastener storage that comprises:
a disc with a plurality of apertures through a first face of the disc and arranged in a plurality of rings concentric with the disc; and
a plurality of machine-readable identifiers located on the first face of the disc and configured to indicate a distance that a fastener is elevated above the first face.

2. The fastener storage of claim 1, wherein the plurality of apertures comprises a single respective aperture diameter in each ring of the plurality of rings.

3. The fastener storage of claim 1, wherein the plurality of apertures comprises a plurality of aperture diameters.

4. The fastener storage of claim 3, wherein an innermost ring of the plurality of rings has a smallest aperture diameter of the plurality of aperture diameters.

5. The fastener storage of claim 3, wherein an innermost ring of the plurality of rings has a largest aperture diameter of the plurality of aperture diameters.

6. The fastener storage of claim 1, wherein an aperture spacing in each ring of the plurality of rings is large enough to have a respective machine-readable identifier of the plurality of machine-readable identifiers.

7. The fastener storage of claim 1, wherein the plurality of machine-readable identifiers comprises QR codes.

8. The fastener storage of claim 1, wherein the plurality of machine-readable identifiers comprises RFID tags.

9. The fastener storage of claim 1, wherein the plurality of machine-readable identifiers comprises bar codes.

10. The fastener storage of claim 1, further comprising a stand interface on a second face of the disc.

11. The fastener storage of claim 1, wherein the plurality of apertures is symmetrical.

12. The fastener storage of claim 1, wherein the disc is non-metallic.

13. The fastener storage of claim 12, wherein each of the plurality of apertures has a respective aperture diameter with a clearance-fit to a predefined fastener.

14. The fastener storage of claim 1, wherein inserts are secured within the plurality of apertures, and wherein the inserts are non-metallic.

15. The fastener storage of claim 14, wherein each of the inserts has a clearance-fit to a predefined fastener.

16. A fastener storage that comprises:
a disc that comprises concentric circles of apertures through a first face of the disc, wherein each of the apertures comprises a respective aperture diameter with a clearance-fit to a predefined fastener and aperture diameters vary between each of the concentric circles; and
machine-readable identifiers on the first face of the disc, each of the machine-readable identifiers configured to identify a distance that a head of a fastener is elevated above the first face.

17. The fastener storage of claim 16, wherein the apertures are asymmetrically placed in the disc.

18. The fastener storage of claim 16, wherein each of the machine-readable identifiers is located closer to an edge of the disc than an aperture it identifies.

19. The fastener storage of claim 16, wherein the machine-readable identifiers are alternated with the apertures.

20. A method of storing fasteners, the method comprising:
placing, shaft first, the fasteners into a set of apertures in a first face of a disc so that, respectively, a head of each of the fasteners remains elevated a distance above the first face; and
assigning fastener size data to a set of machine-readable identifiers allocated to the set of apertures and configured to identify the distance above the first face.

21. A method of storing a fastener, the method comprising:
placing, shaft first, the fastener into an aperture in a first face of a disc such that a head of the fastener remains elevated a distance above the first face; and
assigning fastener size data for the fastener, comprising the distance above the first face, to a machine-readable identifier allocated to the aperture.

22. A method of forming a fastener storage, the method comprising:
analyzing a design for a portion of a structure for fastener quantity, fastener type, and fastener diameter, of a plurality of fasteners in the design;
forming apertures into a disc, the apertures comprising respective aperture diameters selected to hold the plurality of fasteners based on at least one of the fastener diameter or the fastener type in the disc with, respectively, a head of the fastener elevated a distance above the disc; and forming machine-readable identifiers adjacent to each of the apertures, each the machine-readable identifiers identifying, respectively, the distance above the disc for the fastener.

\* \* \* \* \*